United States Patent Office 3,445,433
Patented May 20, 1969

3,445,433
COPOLYMERIZATION OF TRIOXANE WITH AN EPOXY-CONTAINING COMONOMER IN THE PRESENCE OF AN ALDEHYDE
Francis B. McAndrew, Springfield, N.J., assignor to Celanese Corporation, New York, N.Y., a corporation of Delaware
No Drawing. Continuation-in-part of application Ser. No. 361,548, Apr. 21, 1964. This application Mar. 8, 1967, Ser. No. 621,465
Int. Cl. C08g 1/14, 1/10
U.S. Cl. 260—67
14 Claims

ABSTRACT OF THE DISCLOSURE

Trioxane is copolymerized with an epoxy-containing comonomer in the presence of an aldehyde containing at least two carbon atoms in order to reduce the induction period.

Cross-reference to related cases

The present application is a continuation-in-part of the now abandoned application Ser. No. 361,548, filed Apr. 21, 1964, and assigned to the assignee of the present invention.

Background of the invention

The present invention relates to the copolymerization of trioxane with a minor amount of at least one epoxy-containing comonomer in the presence of an aldehyde containing at least two carbon atoms to produce a strong, stable plastic material. More particularly, the invention relates to the achievement of more rapid copolymerization in such processes by substantial reduction of a prepolymerization induction period.

It has previously been disclosed that in some instances when trioxane is homopolymerized, a period of time elapses from when the catalyst or initator is added to the system to when polymerization of the trioxane to high polymer begins. See, for example, Kern et al., Angewandte Chemie, Vol. 73(6), Mar. 21, 1961, pp. 177–186. This time lapse has been referred to as an induction period, during which it is believed that the depolymerization of trioxane to formaldehyde occurs to the essential exclusion of trioxane polymerization. As discussed in the above Kern et al. article, trioxane polymerization itself begins only when the formaldehyde has attained a given equilibrium concentration or amount, which varies with the polymerization reaction temperatures employed.

Ideally, the induction period is as close to zero time as possible such that trioxane polymer formation begins the instant the catalyst is added to the polymerization zone or system.

In order to eliminate or minimize this induction period in the trioxane homopolymerization, sometimes hereinafter referred to as the primary induction period, it has been suggested that extraneous formaldehyde be added to the system, preferably in an amount equal to the aforesaid equilibrium concentration. Thus, when the polymerization catalyst is introduced into the polymerization zone, trioxane polymerization begins immediately.

It has now been found that in addition to the primary induction period, which may or may not occur when trioxane is homopolymerized, a further induction period, sometimes hereinafter referred to as a secondary induction period, occurs when trioxane is copolymerized with an epoxy-containing comonomer. In other words, the secondary induction period is in addition to the primary induction period, whenever the latter occurs. Even if the above-mentioned equilibrium concentration of formaldehyde is extraneously added in order to eliminate the primary induction period, the secondary induction period will still occur.

During the secondary induction period, as in the primary period, essentially no polymerization of trioxane to high polymer takes place. It has also been found that the length of the secondary induction period increases with increasing concentration of epoxy-containing comonomer in the reaction mixture. The induction periods result in inefficient use of the reaction space and necessitate larger reactors for a given amount of product in a given time.

In an application filed of even date herewith, now U.S. Patent No. 3,397,181, granted Aug. 13, 1968, by George Walter Halek and Frank Michael Berardinelli, entitled "Copolymerization of Trioxane with an Epoxy-Containing Comonomer in the Presence of Formaldehyde," and assigned to the assignee of the present invention, it is disclosed that the secondary induction period may be eliminated or minimized by conducting the particular copolymerization in the presence of extraneous formaldehyde, preferably such that there is present at least one mol of formaldehyde for each epoxy ring or equivalent.

As was pointed out in the copending Halek et al. application, now U.S. Patent No. 3,397,181 the secondary induction period occurs only when an epoxy compound is copolymerized with the trioxane and is believed to be due to the epoxy compound acting as a formaldehyde scavenger. The epoxy compound causes the trioxane to depolymerize to formaldehyde which then reacts with the epoxy ring. This depolymerization continues to occur until there is a mol of formaldehyde for each epoxy ring or equivalent

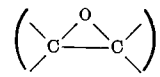

present in the system. Therefore, by adding the extraneous formaldehyde at the outset, high polymer formation begins more quickly, and preferably immediately upon introduction of the catalyst or initiator.

One disadvantage attendant with the use of adding extraneous formaldehyde to the copolymerization system is the difficulty and cost of obtaining and using essentially anhydrous formaldehyde. Trioxane homo- and co-polymerization are desirably conducted under substantially anhydrous conditions.

Summary of the invention

The primary object of the present invention is to substantially reduce or shorten the secondary induction period.

Another object of this invention is to make it possible to carry out the copolymerization reaction at a relatively rapid rate while using low proportions of polymerization catalyst.

Other objects of this invention will be apparent from the following detailed description and claims.

Unless otherwise specified, all proportions in the following detailed description and claims are by weight.

In accordance with the present invention trioxane is copolymerized with an epoxy-containing comonomer in the presence of a trioxane copolymerization catalyst in a copolymerization zone, wherein is introduced an aldehyde containing at least two carbon atoms. The aldehyde is introduced therein in an amount greater than that which is necessary to eliminate any primary induction period.

Description of the preferred embodiment

Even though it had been taught in the above-mentioned copending Halek et al. application that the addition of extraneous formaldehyde would substantially reduce the secondary induction period, it was quite surprising that higher aldehydes would also be effective. The main reason for the doubt was that it was believed that when the aldehyde reacted with the epoxy-containing comonomer to reduce the induction period, the aldehyde would thereby end up as part of the oxymethylene copolymer chain. Aldehydes higher than formaldehyde such as acetaldehyde and benzaldehyde would obviously vary the properties and characteristics of the desired trioxane copolymer if made part of the chain. Unexpectedly, however, it was found that the higher aldehydes not only substantially reduced the secondary induction period, but also did not end up in the oxymethylene copolymer chain. Substantially all of the higher aldehyde used in separately recovered at the conclusion of the copolymerization reaction, as hereinafter exemplified.

While any aldehyde higher than formaldehyde may be used in the present invention, preferably the higher aldehyde is at least one aldehyde selected from the class consisting of aliphatic aldehydes having from 2 to 12 carbon atoms, and aromatic aldehydes having the formula

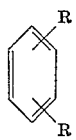

wherein R is selected from the class consisting of hydrogen, and aliphatic aldehydes having from 1 to 12 carbon atoms, at least one R being an aldehyde.

Suitable aliphatic aldehydes for use in the present invention include acetaldehyde; propionaldehyde; butyraldehyde; isobutyraldehyde; acrolein; crotonaldehyde; cyclopropane aldehyde; n-caproaldehyde; glutaraldehyde; glyoxal; and dodecylaldehyde. Suitable aromatic aldehydes are, for example, benzaldehyde; cinnamaldehyde; $\alpha$-methylphenyl acetaldehyde; phenylpropargyl aldehyde; and diphenyl acetaldehyde. Preferably, acetaldehyde and benzaldehyde are used. The above aliphatic and aromatic aldehydes may also contain other substituents such as halo, nitro, keto, hetero-oxygen, hydroxyl, cyano, and alkoxy, provided the substituents do not detrimentally affect the reactivity of the aldehyde towards the epoxy ring.

The number of mols of aldehyde introduced per epoxy ring or equivalent is desirably at least about 0.1. Amounts over about 0.5 mol, are more effective and best results are obtained when there is employed at least about 1 mol, e.g., 1.1 to 6 mols of aldehyde per epoxy ring or equivalent.

It is to be understood that the above mol ranges are to be used to substantially reduce the secondary induction period. When a primary induction period also occurs, then the above amounts are in addition to the equilibrium concentration of aldehyde necessary to eliminate the primary induction period. Preferably, the primary induction period, if it occurs, is eliminated by the introduction of extraneous formaldehyde into the system and the secondary induction period is substantially reduced by the addition of the higher aldehydes in the aforesaid mol ranges.

The equilibrium concentration or amount of formaldehyde or higher aldehyde necessary to eliminate the primary induction period may be determined by simple experimentation as well known to those skilled in the art, for example, by conducting a trioxane homopolymerization run under the same conditions that are to be used in the copolymerization and measuring the amount needed.

The copolymerization conditions of temperature, pressure, type of catalyst, comonomer concentration and the like are similar to those normally used in the copolymerization of trioxane with epoxy-containing comonomers, for example, as described in Walling et al. U.S. Patent No. 3,027,352, which is assigned to the assignee of the present invention. Other patents describing similar copolymerizations of trioxane and epoxides or epoxy compounds are British Patent No. 905,828; French Patent No. 1,319,178, of Fisher, Brown and Heinz; and South African Patent No. 62/4,471 of Heinz and McAndrew, the disclosures of which are incorporated herein by reference.

Suitable catalysts for the copolymerization of trioxane and oxirane (epoxy) compounds are well known in the art, and any of these may be employed in the practice of the present invention. Preferred catalysts of this type are cationic. As is known in the art, the catalyst may be generated in situ by the action of radiation on ingredients of the reaction mixture which are non-catalyst in the absence of such radiation; one class of such activatable non-catalysts includes the light or heat-activatable aryldiazonium fluoborates described in Belgian Patent No. 593,648 of Farbwerke Hoechst. The amount of cationic catalyst usually used in the copolymerization process is between about 1 p.p.m. and about $10^4$ p.p.m. based on the weight of the reactant mass. Boron fluoride-containing catalysts are usually used in amounts between about 1 p.p.m. and about $10^4$ p.p.m. and preferably in amounts between about 10 p.p.m. and about $10^3$ p.p.m. It is of course preferable to use constituents (comonomers and aldehydes) which are free of groups which have an inactivating effect on the catalyst under the conditions used for the copolymerization.

It is preferred to carry out the copolymerization of this invention in the liquid state, most preferably using molten trioxane wherein the molten trioxane constitutes the major portion, generally about 80 percent or more of the reaction mixture. However, it is within the scope of this invention to employ solid-state copolymerization. The copolymerization may be carried out batchwise or continuously.

Generally, the temperature of the copolymerization reaction will be in the range of about 0° to about 115° C., preferably in the range of about 60° to about 90° C.

It is to be understood that the term copolymer as used herein includes terpolymers and higher copolymers. In addition, more than one type of epoxy-containing comonomer may be copolymerized with the trioxane. Comonomers containing no epoxy rings or equivalents may also be employed as long as at least one of the comonomers used contains an epoxy ring or rings.

Illustrative of the epoxy-containing comonomers or compounds which may be used in the present invention are ethylene oxide; 1,2-propylene oxide, vinyl cyclohexene dioxide (1-epoxyethyl, 3,4-epoxycyclohexane), which is a di-expoxypropane, since it has two

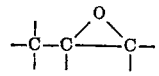

groups; cyclohexane oxide; styrene oxide; 3,4-epoxyvinyl cyclohexane; butadiene dioxide; butadiene monoxide; resorcinol diglycidyl ether; butanediol diglycidyl ether; diglycidyl ether; allyl glycidyl ether; phenyl glycidyl ether; trimethylolpropane triglycidyl ether; dicyclopentadiene dioxide; dipentene dioxide; isobutylene oxide; indene oxide; butylene oxide; octylene oxide and other alkylene oxides; or 1,4-dihydronaphthalene oxide. The epoxy-containing comonomer may also contain non-hydrocarbon substituents; for example there may be used compounds containing halo, nitro, or nitrogenous heterocyclic, or carboxylic ester substituents, such as epichlorohydrin and other epihalohydrins; pentachlorophenyl glycidyl ether; paranitrophenyl glycidyl ether; ethyl $\beta$-methyl-$\beta$-phenyl glycidate; trichloromethyl ethylene oxide; $\alpha$-phenyl-$\alpha$-chloromethyl ethylene oxide; 3-piperonyl-1,2-epoxypropane; or 4-bromo-1-naphthyl ethylene oxide.

Generally, ethylene oxide is more reactive toward trioxane than any of the other above mentioned epoxy compounds. Thus, it is preferred to use ethylene oxide as the sole epoxy compound or to use the other epoxy compounds in association with a second, more highly reactive, comonomer such as ethylene oxide or a cyclic formal such as 1,3-dioxolane. A particularly useful combination of properties is obtained by the use of a blend of a major amount of trioxane, a small amount of a polyfunctional epoxy-containing compound having two copolymerizably reactive groups and a minor, but larger, amount of a second, highly reactive, comonomer of the type mentioned in the preceding sentence.

As mentioned above, other types of comonomers may also be used such as other cyclic ethers, e.g., formals such as dioxolane or pentaerythritol diformal, or oxetanes such as trimethylene oxide; lactones such as gamma-butyrolactone or propiolactone; cyclic anhydrides such as adipic anhydride; cyclic carbonates such as ethylene glycol carbonate or other comonomers known to the art, e.g., vinylidene compounds such as styrene or vinyl isobutyl ether. It is advantageous to limit the total amount of comonomers employed, including both epoxy- and non-epoxy-containing types, so that the oxymethylene content of the resulting copolymer is at least about 90 percent, preferably at least about 95 percent.

In general, the proportions of total comonomer employed may be, for example, the same as those used in the Walling et al., Heinz et al. and Fisher et al. patents previously mentioned. Preferably about 0.5 to 10 percent, based on the weight of the trioxane, of epoxy-containing comonomer is used, more preferably 0.5 to 5.0 percent. The copolymerizable composition may contain suitably 0.01 or more epoxy equivalent per mol of trioxane, more desirably about 0.02 to 0.1 (e.g. 0.04) epoxy equivalent per mol of trioxane.

One preferred process involves the terpolymerization of molten trioxane, 0.5 to 5 percent ethylene oxide and 0.05 to 1.0 percent vinyl cyclohexene dioxide in the presence of a boron fluoride-containing catalyst to produce a solid moldable terpolymer having a 10×/1× ratio of above 30.

Upon completion of the copolymerization reaction to the desired degree, the reaction mixture is usually deactivated by neutralizing the catalyst. A satisfactory method of deactivating the reaction mixture is by washing in an excess of a solution of tributylamine in acetone. The copolymer may then be recovered by successive washings and filtrations in acetone, followed by air drying.

If desired the copolymer may be given a thermal treatment or a hydrolysis or alcoholysis treatment such as is described in U.S. Patent No. 3,103,499 and South African Patent No. 61/1,726 the entire disclosures of which are incorporaated herein by reference. The product of such treatment may be further stabilized by the addition of chemical stabilizers known to the art, such as are described in British Patent No. 951,272, Belgian Patent No. 603,786 and French Patents Nos. 1,330,587 and 1,338,054.

As shown in the following examples it is convenient to blend the aldehyde with the trioxane before the addition of comonomer and catalyst. Other methods of addition may of course be employed. Thus the aldehyde may be blended with the comonomer or with a blend of the comonomer and trioxane. Externally generated aldehyde may even be fed to the copolymerizable reaction mixture after the addition of the catalyst, continuously or batchwise. It is preferred, however, to add the aldehyde to the copolymerization zone or system prior to the addition of the catalyst, as the induction period starts upon introduction of the catalyst or initiator.

The invention is illustrated further by the following examples.

Example I (A) Into a glass tube there were placed 100 parts of freshly distilled molten trioxane, two parts of ethylene oxide, and 0.5 part of vinylcyclohexene dioxide. The tube was then sealed with a Teflon-lined, crown cap ("Teflon" is polytetrafluoroethylene) and placed in a constant temperature bath maintained at 65° C. Thereafter, 2.1 parts of acetaldehyde was injected into the tube through the cap, when had suitable provisions for such injection without breaking the seal, and then a solution of 0.022 part of boron fluoride dibutyl etherate (equivalent to 75 p.p.m. of $BF_3$ based on the weight of trioxane) in 5 parts of cyclohexane was similarly injected into the tube. The mixture in the sealed tube in the constant temperature bath became turbid 8.6 minutes after the addition of catalyst; polymerization then continued until a solid terpolymer was produced.

(B) When 5 parts of benzaldehyde were substituted for the acetaldehyde in the same system, the turbidity was observed 9 minutes after the addition of the aldehyde.

(C) In contrast, when the same conditions were employed but no aldehyde was injected, the time to turbidity was 17.1 minutes.

Example II (A) The procedure set forth in Example IA was followed, all proportions being the same, except that the amount of boron fluoride etherate used was such as to provide 50 p.p.m. of $BF_3$, the amount of acetaldehyde was 2.5 parts, and the trioxane employed was from a different distillation batch. The time to turbidity was 11 minutes, and mass solidified in 28 minutes. 60 minutes after the addition of the catalyst, the tube was removed from the constant temperature bath, and 10 minutes later the catalyst was neutralized by quenching the contents of the tube with a solution of tri-n-butylamine in acetone to stop the reaction. After washing and drying the polymer was stabilized by blending it with 0.1 percent cyanoguanidine and 0.5 percent of a phenolic stabilizer, namely 2,2′-methylene-bis(4-methyl 6-tertiary butyl phenol), and mechanically milling the blend at 210° C. in a nitrogen atmosphere; during this procedure the blend lost 12 percent of its weight. The 10×/1× ratio (defined in the aforesaid Heinz and McAndrew patent) of the resulting stabilized terpolymer was 92.5 and its "$K_{D230}$" (average weight loss on heating at 230° C. for 45 minutes in air) was 0.026, expressed as percent per minute.

(B) When Example IIA was repeated, except that no acetaldehyde was added, no observable reaction took place, even after several hours.

Example III

The procedure set forth in Example IA was followed, all proportions being the same, except that the amount of boron fluoride etherate used was such as to provide 100 p.p.m. of $BF_3$, the trioxane used was from a different distillation batch, benzaldehyde was used in place of the acetaldehyde, and the amount of benzaldehyde was 6 parts. The time to turbidity was 6 minutes. In a control experiment, using the same conditions but no benzaldehyde, the time to turbidity was 16 minutes.

After one hour the tube containing solid polymer was removed from the bath and the polymer was treated (as in Example IIA) to neutralize the catalyst. After washing and drying, the polymer was subjected to a hydrolysis treatment, described below, to increase its thermal stability; during this treatment, the polymer lost 16 percent of its weight. Analysis described below indicated that the benzaldehyde content of the polymer after hydrolysis was zero, while before hydrolysis it was 0.53 percent.

The hydrolyzed polymer was mechanically milled at 210° C. under a nitrogen blanket with 0.1 percent cyanoguanidine and 0.5 percent of the phenolic stabilizer described in Example IIA. The 10×/× ratio of resulting stabilized polymer was 79 and its $K_{D230}$ was 0.023.

In the hydrolysis treatment, mentioned above, 60 parts of polymer and 1000 parts of a mixture of 60 percent methanol, 39.9 percent water and 0.1 percent triethylamine were charged to an autoclave which was then flushed with dry nitrogen, sealed and heated to 160° C. The time to attain this temperature was about 40 minutes, and the pressure in the autoclave was about 230 p.s.i.g. at the peak temperature. The autoclave was then cooled rapidly, and its contents were ground in a Waring blender, then filtered to separate the polymer, which was thereafter washed once with distilled water and three times with acetone and then dried overnight in a vacuum oven at 70° C.

In the analysis of the polymer for benzaldehyde, a 1 gram sample of the polymer was mixed with 100 ml. of aqueous acidic ethylene glycol prepared by mixing 1 part by volume of concentrated hydrochloric acid, 4 parts by volume of water, and 25 parts of volume of ethylene glycol, and the blend was refluxed (Ca 100° C.) until the polymer had depolymerized to the point where it was completely in solution. The ultraviolet spectrum of the solution was compared with the spectrum obtained from a solution of reagent grade benzaldehyde in the same solvent mixture which had been subjected to the same treatment. From this comparison, the benzaldehyde content of the polymer was computed. Wash solutions obtained from the neutralization and washing treatment of the raw polymer and mother liquor and wash solutions from the hydrolysis treatment of the main batch of polymer were analyzed for benzaldehyde content by gas chromatography. By this technique, complete accountability for benzaldehyde was obtained in each case. That is, these latter analyses showed that all the added benzaldehyde not found in the raw polymer appeared in the wash solutions, and all the benzaldehyde present in the raw polymer before hydrolysis was present, after hydrolysis, in the mother liquor and wash solutions.

The principle, preferred embodiment, and mode of operation of the present invention have been described in the foregoing specification. However, it should be understood that the invention which is intended to be protected herein, may be practiced otherwise than as described without departing from the scope of the appended claims.

I claim:
1. In the process for the copolymerization of trioxane, wherein trioxane is copolymerized with at least one epoxy-containing comonomer and wherein the copolymerization is effected in a copolymerization zone in the presence of a trioxane copolymerization catalyst, the improvement which comprises
introducing an aldehyde containing at least two carbon atoms into the copolymerization zone in an amount greater than that which is necessary to eliminate any primary induction period that occurs under the conditions of copolymerization employed.
2. The process of claim 1, wherein the aldehyde is at least one aldehyde selected from the class consisting of aliphatic aldehydes having from 2 to 12 carbon atoms, and aromatic aldehydes having the formula

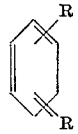

wherein R is selected from the class consisting of hydrogen, and aliphatic aldehydes having from 1 to 12 carbon atoms, at least one R being an aldehyde.
3. The process of claim 2, wherein the aldehyde is introduced into the zone so that it is present therein at the time of introduction of said catalyst.
4. The process of claim 3, wherein the amount of aldehyde introduced into said zone in addition to the amount necessary to eliminate any primary induction period is at least 0.1 mol of aldehyde per epoxy equivalent present therein.
5. The process of claim 3, wherein said trioxane is molten and the amount of aldehyde introduced into said zone in addition to the amount necessary to eliminate any primary induction period is at least about 1.0 mol of aldehyde per epoxy equivalent present therein.
6. The process of claim 5, wherein the aldehyde is acetaldehyde.
7. The process of claim 5, wherein the aldehyde is benzaldehyde.
8. A process for reducing the secondary induction period which occurs during the catalytic copolymerization of trioxane with an epoxy-containing comonomer, which process comprises
(a) introducing trioxane and at least one epoxy-containing comonomer into a copolymerization zone;
(b) introducing into said zone, in contact with the trioxane and comonomer, extraneous formaldehyde in an amount sufficient to eliminate any primary induction period which might occur;
(c) introducing into said zone, in contact with the trioxane and comonomer, at least one aldehyde containing at least two carbon atoms; and
(d) catalytically copolymerizing the trioxane and epoxy-containing comonomer therein.
9. The process of claim 8, wherein the aldehyde is at least one aldehyde selected from the class consisting of aliphatic aldehydes having from 2 to 12 carbon atoms, and aromatic aldehydes having the formula

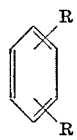

wherein R is selected from the class consisting of hydrogen, and aliphatic aldehydes having from 1 to 12 carbon atoms, at least one R being an aldehyde.
10. The process of claim 9, wherein the aldehyde is introduced into the zone so that it is present therein at the time of introduction of said catalyst.
11. The process of claim 10, wherein substantially all of said aldehyde is subsequently separately recovered from the resulting copolymer.
12. The process of claim 11, wherein the amount of epoxy-containing comonomer present is in the range of from about 0.5 to 10 percent, based on the weight of the trioxane, and the amount of aldehyde introduced into the zone is at least 1.0 mol of aldehyde per epoxy equivalent.
13. The process of claim 11, wherein the trioxane is molten during copolymerization,
the epoxy-containing comonomer is ethylene oxide and is present in an amount in the range of from about 0.5 to 5 percent, based on the weight of the trioxane, and
the amount of aldehyde introduced into the zone is in the range of from 1.1 to 6 mols of aldehyde per epoxy equivalent present therein.
14. The process of claim 13, wherein the aldehyde is selected from the class consisting of acetaldehyde and benzaldehyde.

References Cited
UNITED STATES PATENTS 3,272,780  9/1966  Wilson et al. _____ 260—73
3,332,913  7/1967  Lundberg _____ 260—67

WILLIAM H. SHORT, *Primary Examiner.*

L. M. PHYNES, *Assistant Examiner.*